(12) United States Patent
Brus

(10) Patent No.: US 7,364,454 B2
(45) Date of Patent: Apr. 29, 2008

(54) CABLE END FASTENING DEVICE AND METHOD

(75) Inventor: Bernard Louis Brus, Doetinchem (NL)

(73) Assignee: Lovink-Enertech B.V., Terborg (NL)

( * ) Notice: Subject to any disclaimer, the term of this patent is extended or adjusted under 35 U.S.C. 154(b) by 0 days.

(21) Appl. No.: 10/552,332

(22) PCT Filed: Mar. 24, 2004

(86) PCT No.: PCT/NL2004/000201

§ 371 (c)(1),
(2), (4) Date: Jun. 16, 2006

(87) PCT Pub. No.: WO2004/091066

PCT Pub. Date: Oct. 21, 2004

(65) Prior Publication Data

US 2007/0037435 A1    Feb. 15, 2007

(30) Foreign Application Priority Data

Apr. 9, 2003   (NL) .................................... 1023128

(51) Int. Cl.
*H01R 11/20* (2006.01)
(52) U.S. Cl. ..................... 439/441; 174/84 R
(58) Field of Classification Search ........... 439/439, 439/440, 441, 796; 174/84 R, 84 C, 88 R, 174/88 C, 89, 93
See application file for complete search history.

(56) References Cited

U.S. PATENT DOCUMENTS

| 3,441,659 | A | * | 4/1969 | Laudig et al. | ............ | 174/88 C |
| 4,032,380 | A | * | 6/1977 | Olsson | ........................ | 156/49 |
| 5,766,037 | A | * | 6/1998 | Nelson | ........................ | 439/583 |
| 6,281,442 | B1 | * | 8/2001 | Guzowski | .................. | 174/73.1 |

\* cited by examiner

*Primary Examiner*—Renee Luebke
*Assistant Examiner*—Vanessa Girardi
(74) *Attorney, Agent, or Firm*—McDonnell Boehnen Hulbert & Berghoff LLP

(57) ABSTRACT

The invention relates inter alia to a device for connecting two or more cable ends, which device comprises: —an insertion bush for inserting the two core ends, wherein in use the insertion bus provides conductive contact between the two cores; —an insulator arranged round the insertion bush, —a field control layer arranged round the insulator, —a conductive layer arranged round the field control layer, wherein in use the conductive layer provides conductive contact between the two earth shields, and —a protective sleeve, —fixing means for fixing the cable ends to the device; wherein in use the insulator connects to the insulating sheaths, the field control layer to the field control sheaths, the conductive layer to the earth shields and the protective sleeve to the protective sheaths. The invention further relates to a method for connecting two cable ends or for connecting a cable end to an end element.

65 Claims, 8 Drawing Sheets

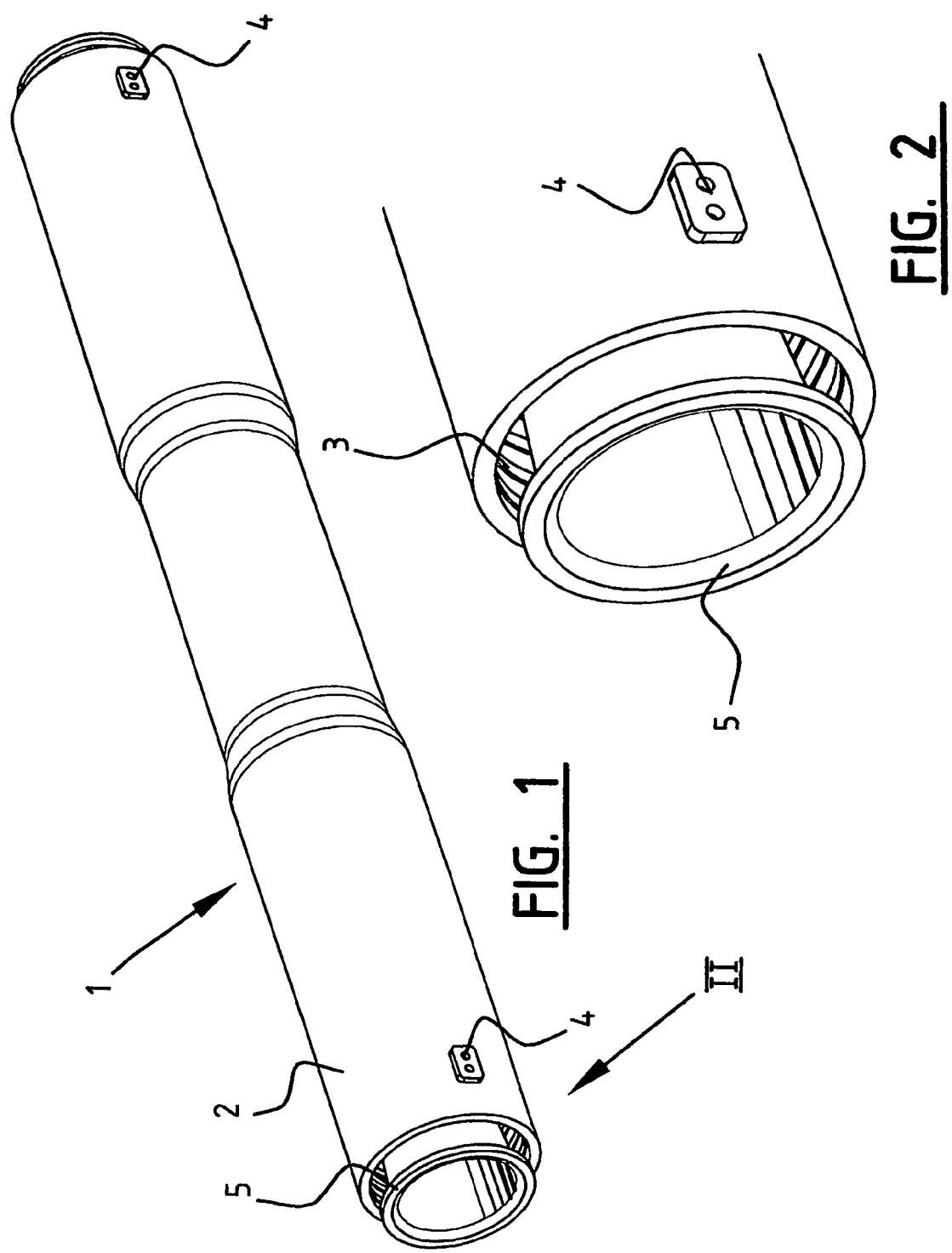

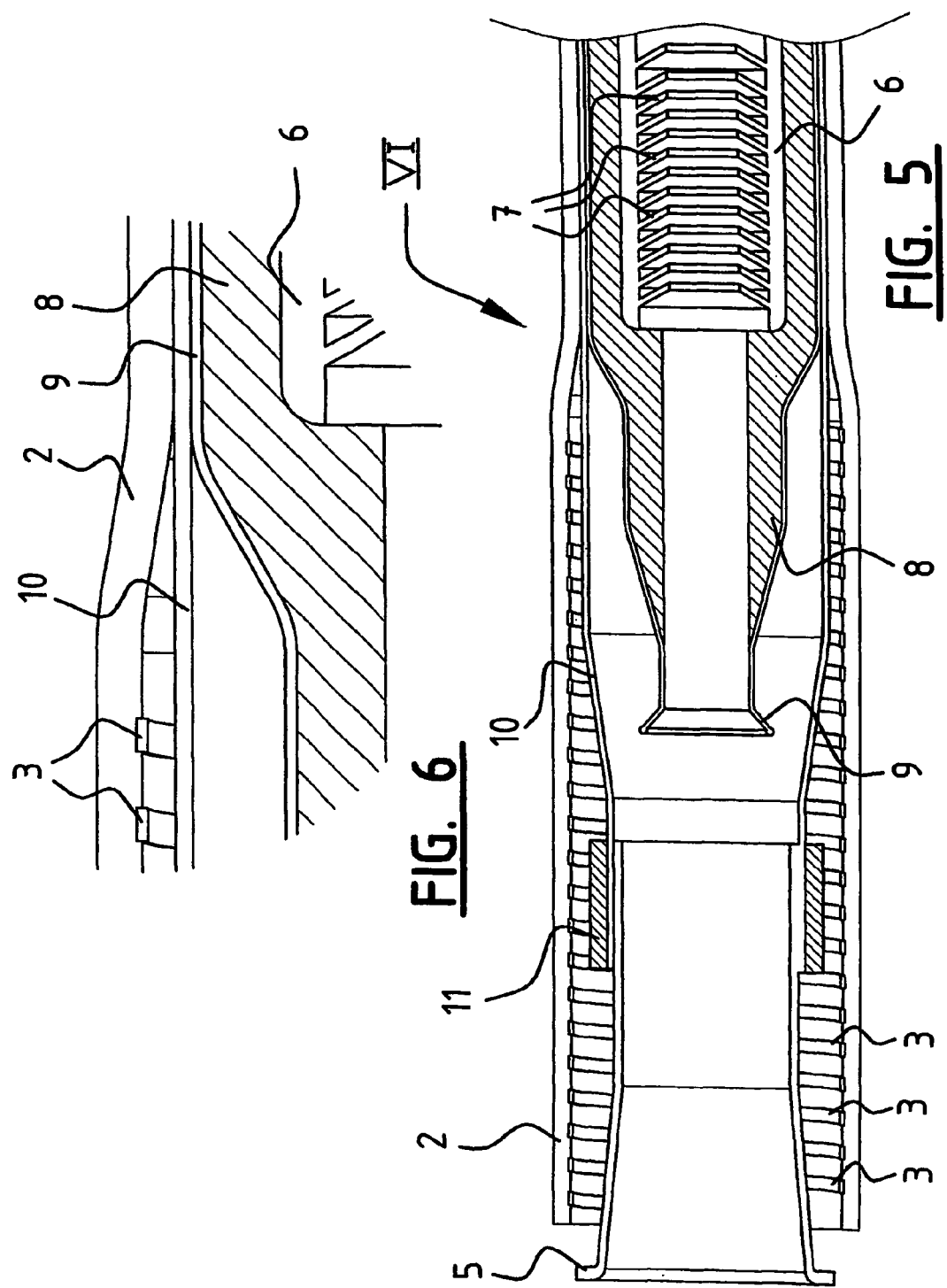

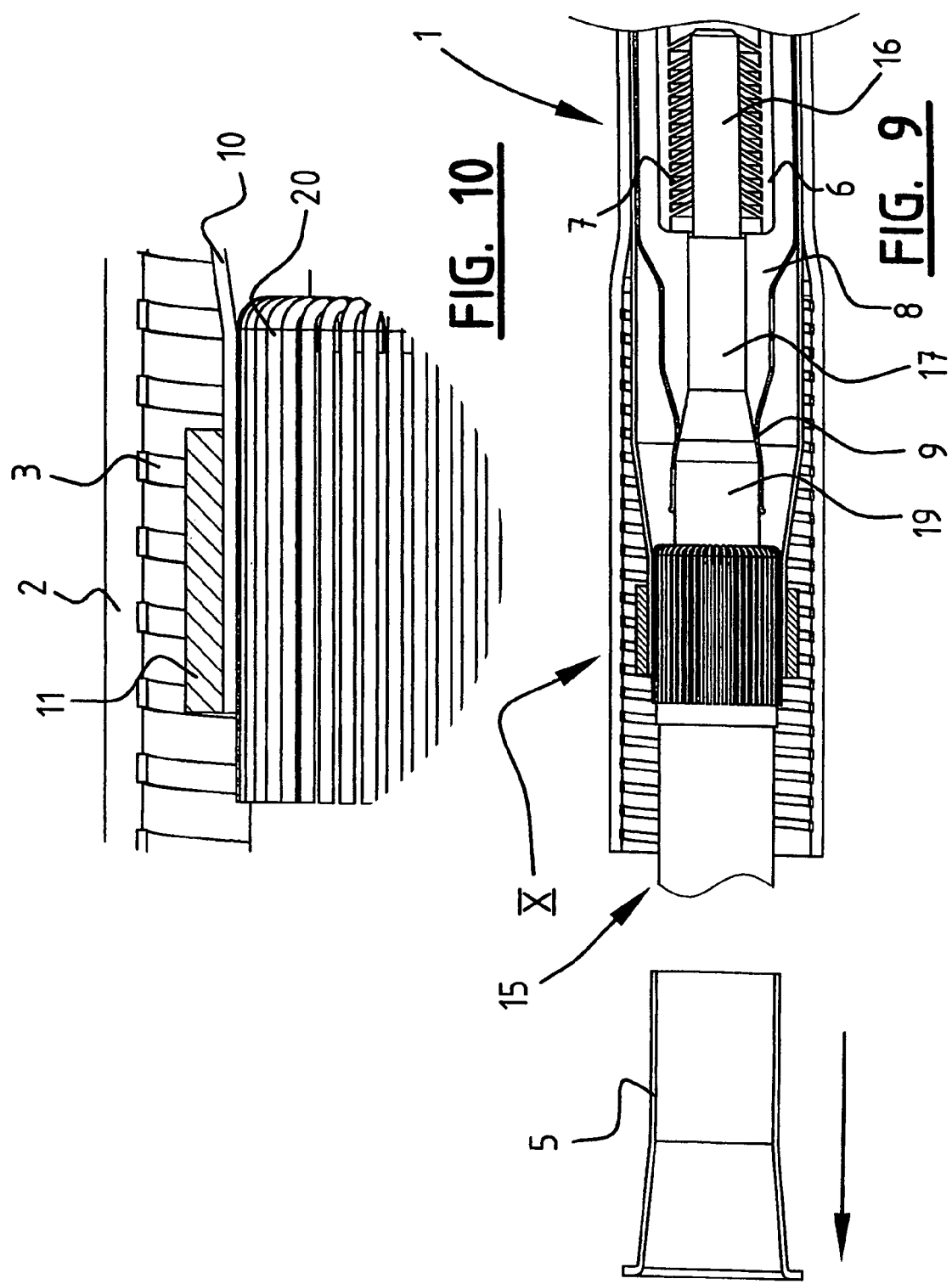

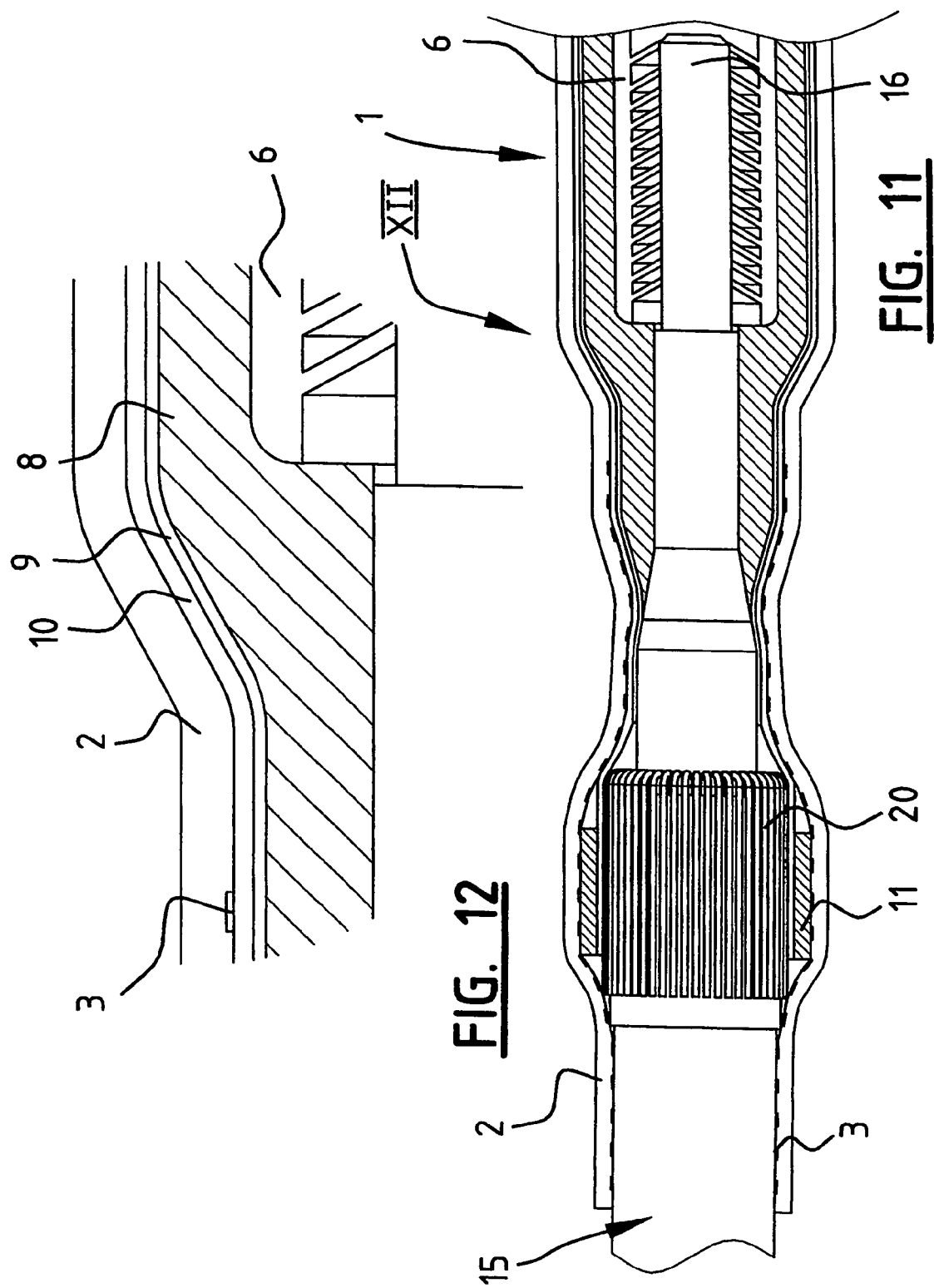

CABLE END FASTENING DEVICE AND METHOD

The invention relates to a device for connecting two cable ends or at least one cable end to an end element, which cable ends each comprise at least one core, an insulating sheath arranged therearound, a field control sheath arranged around the insulating layer, an earth shield arranged around the field control sheath and a protective sheath. The invention also relates to a method for connecting cable ends.

Such cables are used for medium and high voltage, i.e. for voltages over 1000 volts. A connection of two such cable ends or a connection of a cable end to an end element must comply with high standards. If excessively high field strengths occur, this can result in the occurrence of partial discharges. These can adversely affect the quality of the cable connection. Partial discharges moreover often foreshadow a complete breakdown, which can permanently damage the cable connection.

In the connection of two cable ends or a cable end and an end element, it is important that the materials between the different voltage-carrying layers are homogeneous. If this is not the case, the local field strength can become high due to differences in the dielectric constant. Air inclusions in particular can result in malfunction, since the dielectric constant is relatively low compared to that of the surrounding materials. The distribution of the electric field will hereby become asymmetrical and the field strength will, in other words, become extra-high all around the air inclusion. This is an additional drawback since the breakdown voltage of air is significantly lower than that of the surrounding materials.

Numerous cable sleeves are already known with which two cable ends can be attached to each other. However, the known cable sleeves require a large number of operations to be able to fulfil the above stated requirement of homogeneity. Cable sleeves are thus known wherein the different conductive and field control layers are mutually connected, whereafter shell parts are placed therearound and an insulating mass is poured therein so as to thus obtain the required insulation and exclusion of air. The arranging of such a sleeve requires considerable time, and it is therefore desired to provide a cable sleeve or device for connecting two cable ends, wherein the number of operations can remain limited.

The document WO 90/13933 describes a connection in which the conductors of two stripped cable ends or a stripped cable end and an end element are mutually connected by fixing thereof to a plug and a counter-plug and then sliding the plug and counter-plug into a metal coupling bush. The plug and counter-plug are provided with pawls under spring pressure which in retracted state come to lie in recesses in the coupling bush, so that the plug and counter-plug, and thereby the cable ends connected thereto, become fixed in the coupling bush. Once the earth shields of the cable have subsequently been connected to each other, separate moisture repellent layers and mechanical protection layers are arranged.

A drawback of the known device is that the cable ends must first be welded to respectively a plug and a counter-plug, which is labour-intensive. Welding of the cable ends furthermore encounters practical problems of implementation, for instance when the cables are to be connected to each other in the field. A further drawback of the known invention is that protective layers for protection against environmental influences must still be separately arranged, which takes considerable time and in practice can moreover result in implementation errors. A further drawback is that the cable ends are only coupled with their cores. In the case of high tensile loads on the cables, this can result in a cable breaking.

It is therefore an object of the invention to provide a device and method for connecting two cable ends or at least a cable end to an end element, wherein one or more of the above stated and other drawbacks of the prior art are obviated.

It is a further object of the present invention to provide a device and method for connecting two cable ends or at least a cable end to an end element, wherein the number of operations required for the connection remains limited.

It is a further object of the invention to provide a device and method, wherein the conducting elements (core, earth shield, end element) can be mutually connected in relatively rapid and simple manner, wherein the electric field remains as homogeneous as possible, an adequate protection is provided against outside influences (such as moisture penetration), and a good screening of the electric field to the outside is provided.

It is a further object of the invention to provide a device and method whereby a connection can be realized which is suitable for a relatively high tensile load on the cable.

According to a first aspect of the present invention, one or more of these objects are achieved in a device for connecting two or more cable ends, wherein each of the cable ends is constructed from at least a core, an insulating sheath and an earth shield, which device comprises:
   an insertion bush for inserting the two core ends,
   an insulator arranged around the insertion bush,
   a conductive layer, wherein in use the conductive layer is disposed in order to provide electrical contact between the two earth shields, wherein fixing means are provided for fixing the cable ends to the device; and that in use the insertion bush connects against the cores of the cable ends to provide conductive contact between the cores, and in use the insulator and the conductive layer connect almost or wholly to respectively the insulating sheaths and the earth shields of the cable ends.

When a field control sheath is provided round the insulating sheath of the cable and/or a protective sheath is provided around the earth shield, the device also comprises a field control layer and/or a protective sleeve as defined respectively in claim 2 or 3.

In one step the cable ends (or the one cable end in the case of the end fitting discussed below) can be pushed into the connecting device, whereafter in the inserted position a good, possibly conducting connection is automatically realized between the cable ends without additional operations. The connecting device requires only a simple inserting operation to connect the different cable coverings and corresponding layers to each other. It is thus no longer necessary, as in conventional cable sleeves, to connect each component of a cable individually to a corresponding component of the other cable, or to have to perform extra operations, such as for instance fixing plugs, before the connection can be realized.

After the inserting operation, optionally followed by the fixing operation, the other functions required of a cable connection are also fulfilled, such as the homogeneity of the electric field, the mechanical shielding against outside influences, and so on.

The insulating layer is preferably manufactured from flexible material in order to ensure that this insulating layer lies properly against the exposed core ends, whereby no air inclusions are present.

The cable ends are stripped and preferably conically stripped, and in particular the insulating layer, whereby insertion of the thus stripped cable is relatively simple.

The field control material is preferably semiconducting material. Within the scope of this invention semiconducting material is otherwise understood to mean a material with relatively poor conducting properties (characteristically a resistance per running cm of 500Ω or more). The semiconducting layer or sheath can be manufactured wholly of the semiconducting material or can be manufactured from an insulating material, such as plastic, which is filled with a material with conducting properties. The field control material can further be a material with a relatively high dielectric constant. The electric field can also be controlled in correct manner with such a material.

In order to provide electrical contact between the conductive layer and an earth shield it is not otherwise necessary that the conductive layer and an earth shield contact each other. As long as the distance between the conductive layer and the earth shield is small enough, or in the case a sufficiently conductive additional layer is arranged between the conductive layer and the earth shield, electrical contact can be ensured. The same also applies for instance for the field control between the field control layer and the field control sheaths.

The invention not only relates to the above stated connecting device between two cable ends, but also to a connecting device between a cable end and an end element. According to this aspect of the invention, a device is provided for connecting a stripped cable end to an end element, wherein the cable is at least constructed from a core, an insulating sheath and an earth shield, which device comprises:

an insertion bush for inserting the core end;

a sleeve-shaped insulator arranged around the insertion bush; wherein fixing means are provided for fixing the cable end to the device and that in use the insertion bush connects against the core so as to provide electrical contact between the core and the end element, and in use the insulator connects almost or wholly to the insulating sheath of the cable.

In similar manner as described above, it is possible to provide a good connection between the cable and the end element merely by inserting the cable end and by fixing the cable end to the device.

It will be apparent that the embodiments described above and hereinbelow in respect of the device for connecting two cable ends can equally be applied to the device for connecting the cable end to the end element.

In a preferred embodiment of the device according to the invention, the insertion bush comprises clamping means for fixedly clamping the inserted core ends. According to a preferred embodiment, the device comprises an insertion bush, wherein the clamping means engage on the inserted core ends and the fixing means engage on at least one of the earth shield, the insulating sheath and the field control sheath. When pushed in, the core end is thus first clamped, whereafter the rest of the cable end can be secured by the fixing means. The device thus engages on the cable end at different positions, which reduces the chance of breakage at high tensile loads.

In another preferred embodiment the clamping means are adapted to provide a relatively low resistance to a movement of core end in insertion direction and to provide a relatively high resistance to movement in the opposite direction. Once a cable end has been pushed into an insertion bush with relatively little force, it can only be removed again from the insertion bush with relatively great force and effort. In a particularly advantageous embodiment, the clamping means comprise a number of lips extending obliquely in the insertion direction, so that the relevant core end can be easily inserted and the obliquely placed lips act as barbs when a core is pulled.

Other clamping means can of course also be envisaged which exert a clamping force on the core immediately upon insertion thereof.

In another preferred embodiment of the device according to the invention, spring means are arranged around the conductive layer in order to compress this layer in radial direction. In order to obtain a good conducting contact between the earth shield and the conductive layer, it is necessary that these two layers lie properly against each other. The spring means ensure that a good contact is still obtained even in the case of slightly deformed layers.

In yet another preferred embodiment of the device according to the invention, the fixing means comprise a plastic sleeve which is arranged round the conductive layer is shrinkable at least in radial direction. This shrinkable tube can be the same as the protective sleeve, but may also be a separate sleeve. The shrinkable sleeve is preferably manufactured from a heat-activated plastic. Such a plastic has the property that it returns to an original state at high temperatures. It is thus possible through heating to shrink the sleeve round the other parts of the device and the cable ends, thus creating a good watertight seal.

In yet another preferred embodiment heating means are provided. These heating means can comprise at least one resistance wire arranged on the wall of the sleeve. The technician therefore need only apply a voltage to the resistance wire, which heats up as a result thereof and provides the necessary heat causing the sleeve to shrink.

In another preferred embodiment the fixing means comprise a sleeve which is arranged around the conductive layer and which is compressible in at least radial direction, for instance a tube manufactured from flexible plastic. This compressible tube can be the same as the protective sleeve, but can also be formed by a separate tube. The tube can herein be compressed, for instance at both outer ends, against the outside of the cable in order to ensure a sealing of the tube relative to the cable. The thus compressed ends of the tube are optionally provided with sealing material, such as tape, in order to make the seal between the tube and the cable watertight.

In yet another preferred embodiment, the fixing means comprise an elastic sleeve arranged around the conductive layer. The sleeve is hereby stretched so far by means of spacers that the cable can be easily inserted. After the cable has been inserted, the spacers can be removed and the elastic tube is clamped fixedly to the cable. It is here also the case that the elastic sleeve can be the same as the protective sleeve, but may also be formed by a separate tube.

In yet another preferred embodiment, the fixing means comprise an essentially rigid sleeve which is arranged around the conductive layer, and the outer ends of which have a conical shape. Before arranging of the cable in the device, the conical ends of the tube are sawn off such that the remaining cross-section of the tube substantially corresponds with that of the cable. The thus sawn-off ends of the tube are optionally provided with sealing material, such as tape, in order to make the seal between the tube and the cable watertight. It is otherwise also the case for this embodiment that the sleeve can be the same as the protective sleeve, but may also be formed by a separate tube.

In yet another embodiment of the device, there is provided a spacer for holding the conductive layer at a predetermined diameter. This simplifies insertion of the cable end into the device. After insertion the spacer can be removed or deactivated so that the conductive layer can make contact with the earth shield of the cable ends.

The invention also relates to a method for connecting at least two cable ends, which cable ends each comprise at least a core, an insulating sheath and an earth shield, which method comprises the steps of:

providing a connecting device comprising at least an insertion bush having an insulator therearound and a conductive layer;

stripping each cable end in stepwise manner;

successively inserting each core end into the device;

characterized by inserting the cable ends in the device until the cores connect against the insertion bush in order to provide conductive contact between the cores of the different cable ends and until the insulator and the conductive layer almost or wholly connect to respectively the insulating sheaths and the earth shields of the cable ends; and fixing the cable ends relative to the connecting device.

The invention likewise comprises a method for connecting a cable end to an end element as defined in claim 31.

Using such a method the layers of the core ends are mutually connected with only a simple insertion operation followed by a fixing operation. It is thus no longer necessary, as in conventional methods, to connect every layer to each other individually.

In a preferred embodiment the fixing comprises of at least partly heating a component of the connecting device made from shrinkable material. Through the use of for instance a hot-air gun or burner, the connection of the different layers and a strong fixation of the cable ends in the device can thus be realized.

In another embodiment of the method according to the invention, conducting contact between the cable ends is provided by inserting the cable ends. This inserting can for instance release a biased spring, whereby the different layers are pressed together under spring tension.

Another embodiment of the method according to the invention comprises of removing a spacer whereby the conducting contact between the cable ends is provided, so that the conductive layer can be pressed against the earth shield. The spacer then ensures that the conductive layer is held at a predetermined diameter so that the cable ends can be easily inserted into the device. By now removing the spacer the conductive layer can come into contact with the earth shield. In the case spring means are present, the spring means can fulfil their function after removal of the spacer.

In a preferred embodiment of the method according to the invention, the earth shield is folded over after the stepwise removal of the different layers. This simplifies insertion of the cable ends.

In another preferred embodiment, in the case of cables of different cable diameter, at least a part of the insulating sheath of the relevant cable is stripped such that this part has a substantially constant diameter. This enables a universal application of the method to cables of different thickness. Furthermore, the insulating sheath can herein be stripped such that a conical transition results between said part of the insulating sheath and the field control layer, whereby the required pressing force can remain limited.

In yet another embodiment of the method according to the invention, a sleeve is placed between the cable end and the folded earth shield in order to prevent the earth shield being pressed into the cable end. So as to obtain a good electrical contact between the earth shield and the conductive layer, it is important that these layers are pressed properly against each other. In one embodiment spring means can be used for this purpose. Since the outer sheath of the cable ends is of plastic, there is the danger of the earth shield being pressed into the outer sheath by the pressing force. There is a danger here of the electrical contact between the earth shield and the conductive layer being reduced in the course of time. This possible effect is prevented by arranging a sleeve of a non-compressible material, such as for instance a metal.

These and other features of the invention are further elucidated with reference to the annexed drawings.

FIG. 1 shows an embodiment of the device according to the invention in perspective view.

FIG. 2 shows a detail of the device according to FIG. 1.

FIG. 5 shows a partial cross-section of the device of FIG. 1.

FIG. 6 shows a detail of FIG. 5.

FIG. 9 shows a cross-sectional view of the device of FIG. 1, into which a cable end is fully inserted.

FIG. 10 shows a detail of FIG. 9.

FIG. 11 shows a cross-sectional view of the device of FIG. 1 in fully assembled state.

FIG. 12 herein shows a detail of FIG. 11.

Figure 13:
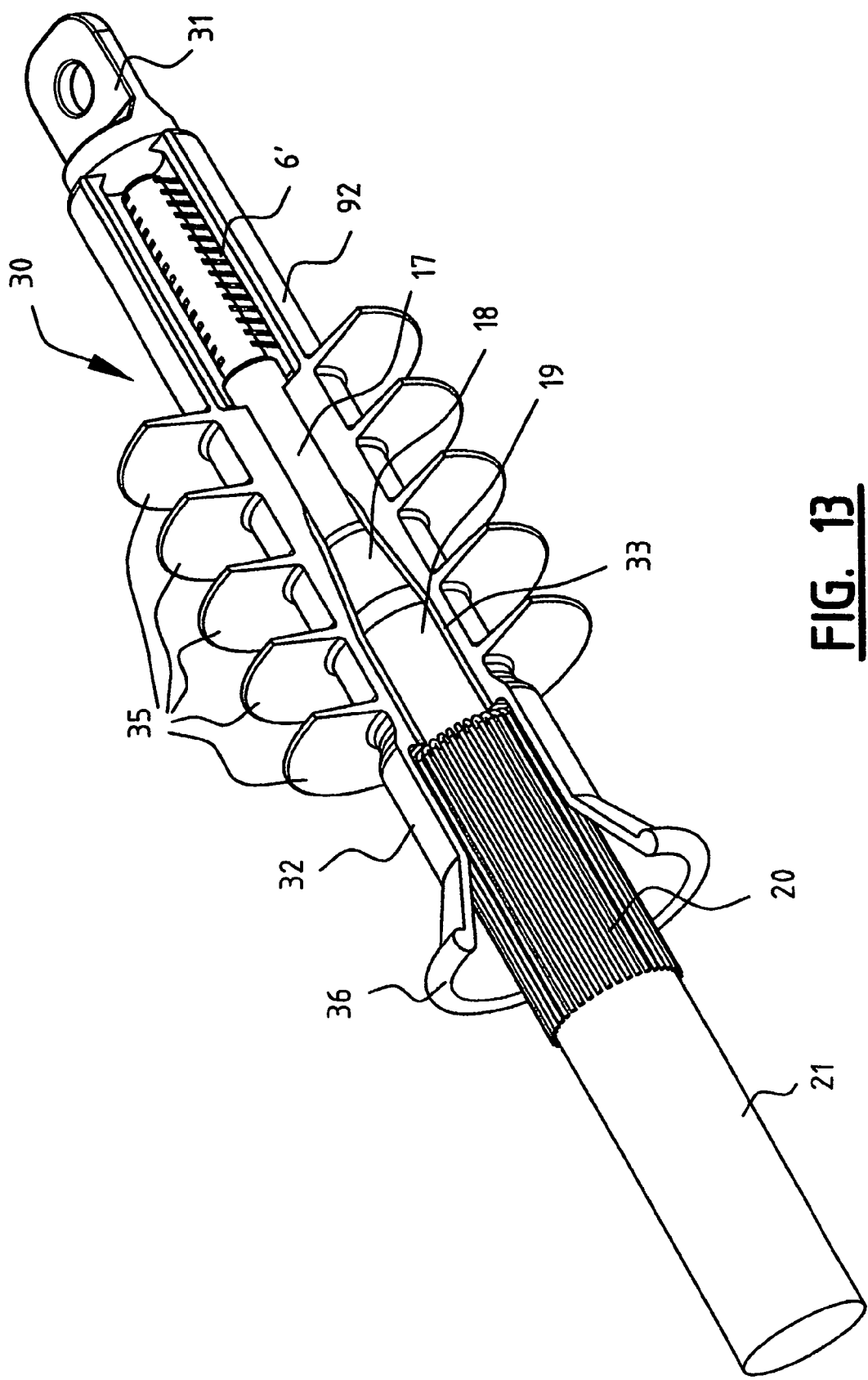

FIG. 13 shows a cross-sectional view of another preferred embodiment of the invention.

FIG. 1 shows an embodiment of the device according to the invention. This device 1 is mirror-symmetrical, and in the further description only one side of device 1 in particular will be shown and discussed. Device 1 has an outer wall 2 which is shrinkable over a part of its surface or over the entire surface. The shrinking is activated by heat. In the shown embodiment this heat is provided via a resistance wire 3 arranged in the wall. Current can be applied to resistance wire 3 via a connector 4 so that the shrinkable outer wall 2 can be activated.

FIGS. 1 and 2 further show a spacing bush 5, which will be further described hereinbelow.

Figure 3:
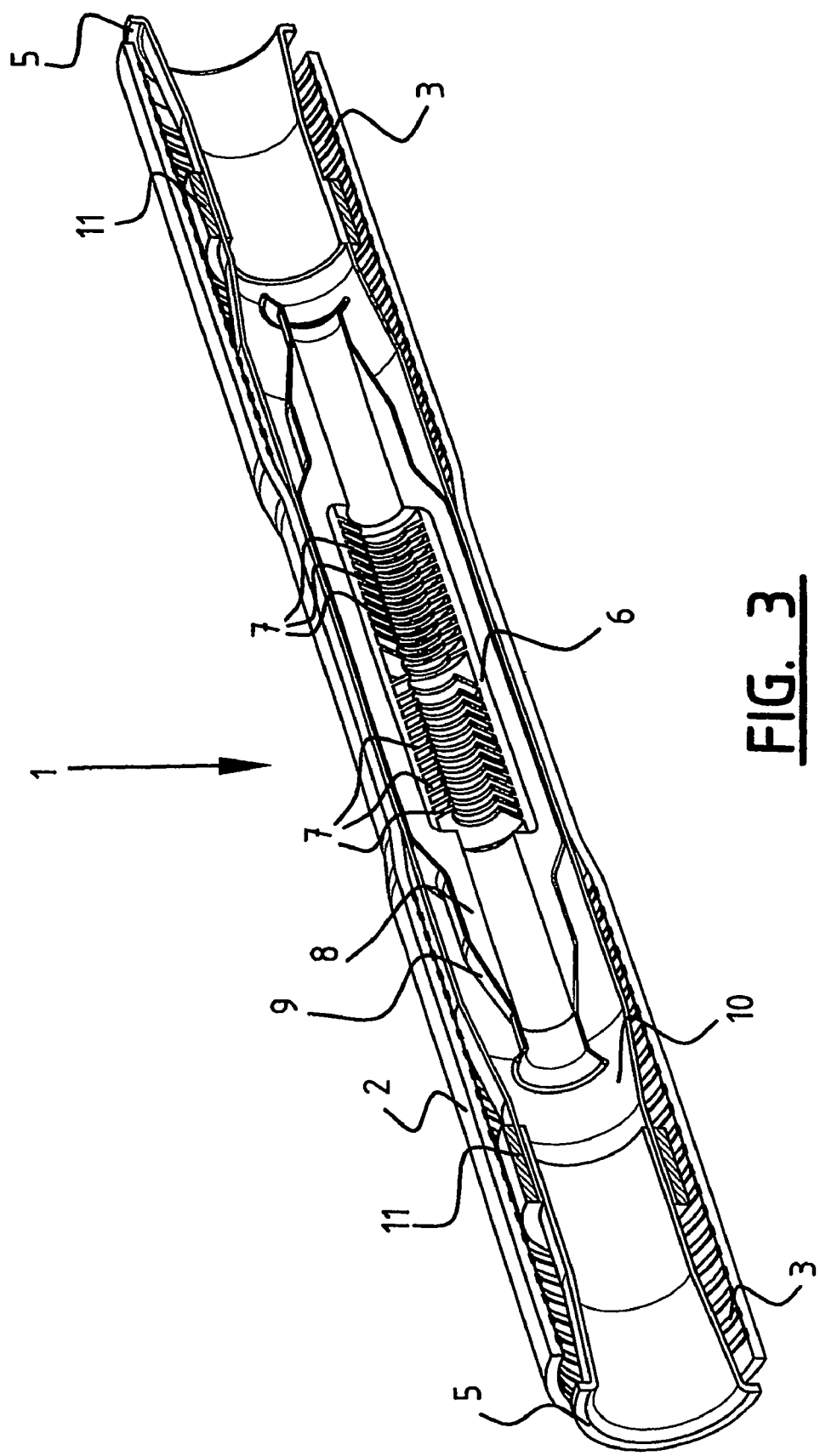
FIG. 3 shows a perspective cross-sectional view of the device of FIG. 1.

FIG. 3 shows device 1 in perspective cross-sectional view.

An insertion bush 6 is arranged in device 1. Arranged in this insertion bush 6 are a large number of obliquely extending lips 7. In the shown embodiment the oblique lips 7 are annular. The lips are formed and are resilient, like cup springs, such that they enable simple insertion of a wire core (as will be described below), provide a sufficient pressing force and prevent the possibility of a core, once inserted, being pulled out again.

A flexible sleeve 8 of an electrically insulating material is arranged around insertion bush 6. The outside of this flexible sleeve 8 is provided with a layer of field control material 9. Sleeve 8 and layer 9 together form a flexible insulating layer.

A flexible conductive sleeve 10 is arranged around insertion bush 6 and flexible insulating layer 8, 9. This flexible conductive layer can for instance be embodied as a web of conductors, such as for instance copper wires.

Arranged on both the ends of this flexible conductive sleeve 10 are spring elements 11 which are held at a predetermined diameter by means of spacing bushes 5.

Around this is arranged the above stated shrinkable outer wall 2, which has already been shrunk in a central portion so as to hold the different components together.

Figure 4:
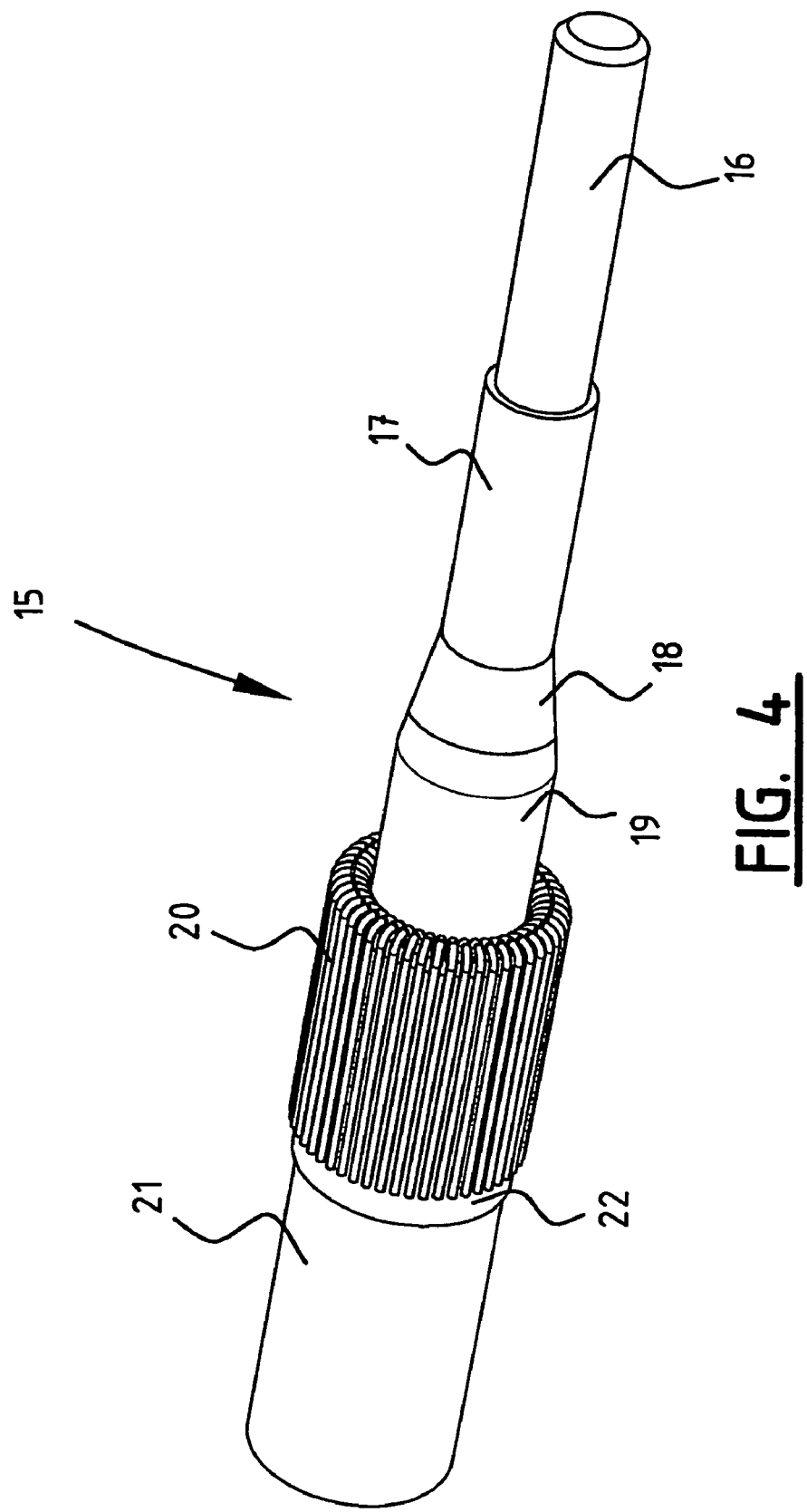
FIG. 4 shows a cable end, wherein the different layers have been removed stepwise.

FIG. 4 shows a cable end 15 which can be inserted into device 1. The cable end is stripped, which means that the different layers are removed in stepwise manner.

Cable 15 comprises a core 16 around which is arranged an insulating layer 17. Core 16 can be solid, but is embodied in most cases as a large number of individual strands brought into circular connection. Depending on the unevenness of the outer surface of the core, a field control layer can be provided therearound. In many cases however, this layer is not necessary.

The outer surface of insulating layer 17 round the core (or round the field control layer) transposes via a conical part 18 into the layer of field control material 19. This conical part 18 is provided in this embodiment to enable insertion of a thicker cable into device 1. If the cable is less thick, this conical part 18 can be smaller or can even be omitted. When a core or core bundle with a diameter of 15 mm is for instance applied, insulating layer 17 is stripped to 20 mm, while in the case of a core or core bundle of 18 mm, the insulating layer 17 is likewise stripped to 20 mm. In this latter case the conical part is therefore larger.

An advantage hereof is that device 1,30 can be universally applied to cables of different thickness and that the pressing forces can remain limited.

An earth shield 20 consisting of wires is arranged around field control layer 19. The outer end of this earth shield 20 is trained around the outer sheath 21 of cable 15. Between the trained part of earth shield 20 and outer sheath 21 there can be further provided a metal bush 22 which prevents the wires being pushed into outer sheath 21 when earth shield 20 is pressed firmly.

FIGS. 5 and 6 show device 1 in more detail. FIG. 6 in particular shows clearly that outer wall 2 has shrunk at the position of insertion bush 6, so that this sleeve 2 holds the conductive layer 10, field control layer 9 and insulating layer 8 in place on insertion bush 6. FIG. 5 further shows the oblique position of lips 7. Finally, FIG. 5 clearly shows that the inner wall of the shrinkable outer wall or sleeve 2 is provided with resistance wires 3.

Figures 7, 8:
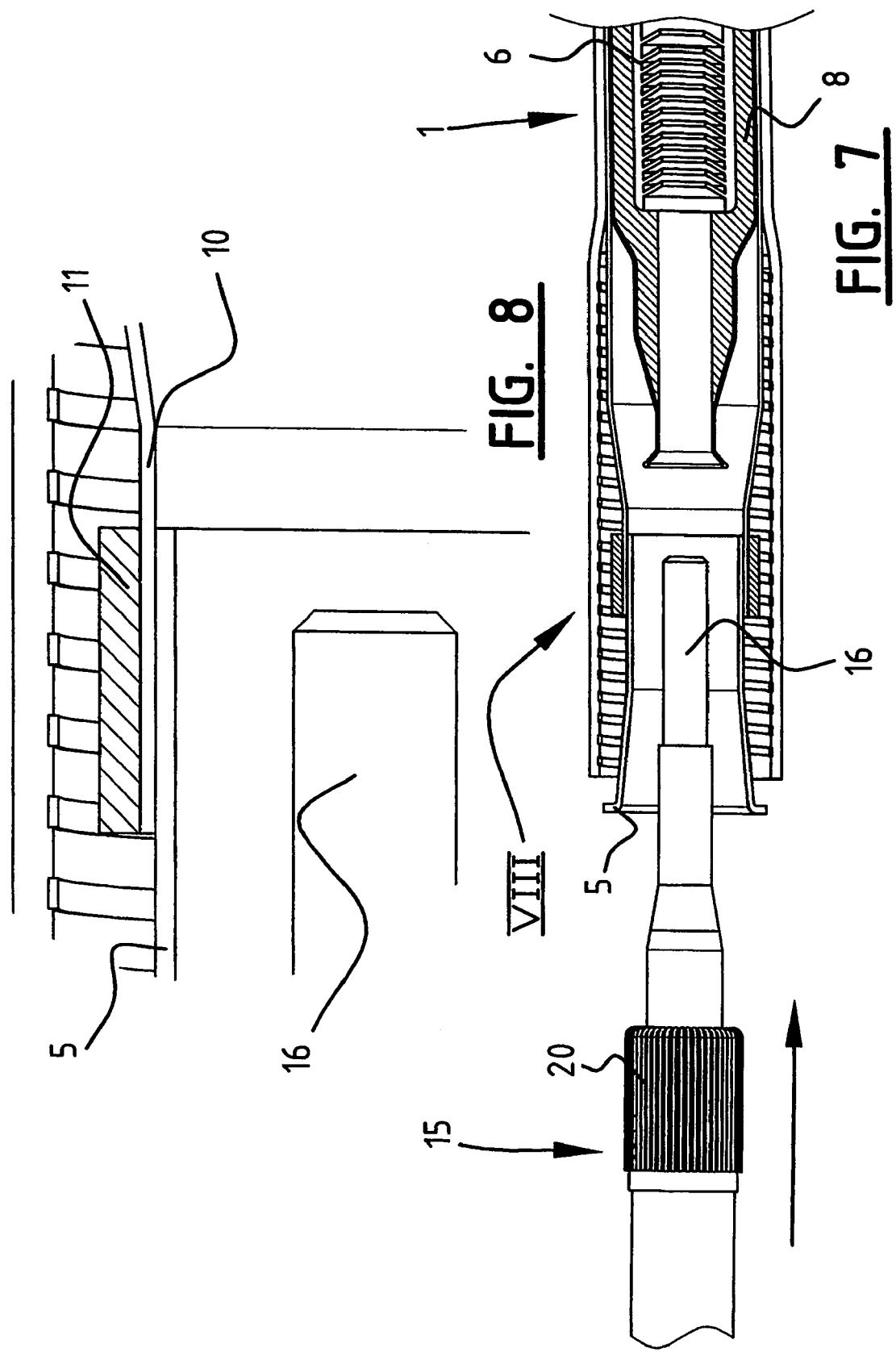
FIG. 7 shows a cross-sectional view of the device wherein a cable end is inserted.
FIG. 8 shows a detail of FIG. 7.

FIG. 7 shows the situation wherein a cable end 15 is inserted into device 1. The core end 16 is pressed into insertion bush 6. The other layers of the cable end will herein push away the flexible insulating layer 8, so that this comes to lie against the different layers of cable end 15. In this situation the spacing bush 5 is placed in device 1 so that there is sufficient space to place earth shield 20 easily in device 1. It can be clearly seen in FIG. 8 that spacing bush 5 holds the conductive layer 10 and spring ring 11 at a predetermined diameter.

FIGS. 9 and 10 show the situation in which cable end 15 is inserted fully into device 1. Core 16 is herein placed in insertion bush 6 and is held there by lips 7. Insulating layer 17 is surrounded by the flexible insulating sleeve 8. The field control layer 9 of flexible sleeve 8 lies against the field control layer 19 of cable end 15. Spacing bush 5 has further been removed, whereby spring ring 11 can perform its function and thus presses the conductive layer 10 against earth shield 20.

FIGS. 11 and 12 show the situation wherein the shrinkable sleeve 2 has shrunk due to a current being applied to resistance wires 3. It is of course also possible to activate the plastic of shrinkable sleeve 2 using for instance hot air. Sleeve 2 hereby shrinks and it is ensured that the different layers of device 1 lie against cable end 15.

Although the figures only show embodiments with only one core per cable, this invention is equally applicable for a cable with a plurality of cores. For this purpose the number of functional elements of the shown devices is adjusted to the number of cores for connecting.

An embodiment can further be envisaged in which a cable end is connected to a fixed end element, such as a connecting element of a transformer. FIG. 13 shows a preferred embodiment of such an end fitting or cable socket 30. Reference numerals 17-21 in the figure indicate the same components of the cable as designated in the previous figures.

A cable end is shown in inserted situation, i.e. in the situation where the cable end is pushed fully into connecting element 30. Connecting element 30 is essentially half the device 1 shown with reference to FIGS. 1-12, wherein the left-hand part 6' of insertion bush 6 is not connected to a right-hand insertion bush part but to a connecting end 31 manufactured from conducting material. In the shown embodiment this is provided with an opening so that the connecting end can be attached in simple manner to a further object, such as a transformer and so on. An insulating sleeve 32 is provided around insertion bush 6'. The insulating sleeve extends beyond the outer end of insertion bush 6' remote from connecting end 31, wherein in the inserted situation at least the field control layer 19 of the cable, but preferably also at least a part of the trained earth shield 20, is enclosed by the insulating sleeve.

In the shown embodiment a field control layer 33 is also arranged over a part of the inner surface of insulating sleeve 32. In the inserted position the field control layer 33 herein covers the field control layer 19 and a part of the insulating layer 17 of the cable.

Insulating sleeve 32 is provided on the end remote from connecting end 31 with a funnel-shaped end, also referred to as radiation funnel 36. Radiation funnel 36 has the purpose of causing the fewest possible local disturbances of the electric field. Although not essential, a number of (five) dish-shaped protrusions 35 are also arranged on insulating sleeve 32, which further reduce the chance of flash-over between connecting end 31 and earth shield 20.

Once the stripped cable end has been pushed wholly into connecting element 30 and components 17-21 of the cable end connect in correct manner to the different components of connecting element 30, the insulating sleeve 32 can also be shrunk in this embodiment, for instance by heating insulating sleeve 32 at a position between dishes 35 and funnel-shaped end 36. As described above, the heat can herein be supplied by external means or by internal means, such as for instance by means of a resistance wire.

The different components of the device are preferably integrated into one whole. This means that the cable ends (or the one cable end in the case of an end fitting) can be arranged in the device in one movement, wherein the correct electrical connection(s) are immediately realized, without additional operations being required here. In the inserted situation the device then only has to be fixed to the cable, this preferably by means of one of the fixation methods described herein.

In the shown preferred embodiments the device is provided with one or more field control layers. Embodiments can however also be envisaged, for instance when the device is applied at relatively low voltages and therefore with relatively weak electric fields, in which the field control sheaths in the cables, and therefore the field control layer in the device, can be omitted. Reference has also been made above to embodiments of the connecting device which are provided with a shrinkable, compressible and/or elastic outer wall or protective sleeve 2. In determined embodiments this outer wall can be omitted or replaced with a woven copper casing.

The present invention is not limited to the above described preferred embodiments thereof. The rights sought are rather defined by the following claims, within the scope of which many modifications can be envisaged. It is therefore conceivable for instance to provide insertion bush 6 with a pawl mechanism, wherein only when the cable end has been fully inserted into insertion bush 6 are fixing lips pressed against the core of the cable so as to fix it relative to the device. The above stated lips 7 can herein be omitted.

The invention claimed is:

1. A connecting device for connecting two or more cable ends, wherein each of the cable ends is constructed from at least a core, an insulating sheath and an earth shield, the connecting device comprising:
   an insertion bush comprising clamping means for inserting the two cores of the cable ends, whereupon insertion of the cores into the insertion bush causes the clamping means to secure the cores therein;
   an insulator arranged around the insertion bush;
   a conductive layer, wherein the conductive layer is provides electrical contact between the two earth shields of the two cable ends;
   wherein a fixing means for fixing the cable ends to the connecting device; and
   wherein after the cores are secured within the insertion bush, the insertion bush against is in cooperative contact with the cores of the cable ends to provide conductive contact between the cores, and the insulator and the conductive layer are in cooperative contact with respectively the insulating sheaths and the earth shields of the cable ends.

2. The connecting device of claim 1, wherein the fixing means comprise a tube which is arranged around the conductive layer and which is compressible in at least a radial direction.

3. The connecting device of claim 1, wherein the fixing means comprise an elastic sleeve arranged around the conductive layer.

4. The connecting device of claim 1, wherein the fixing means comprise a sleeve arranged around the conductive layer, wherein both outer ends of the fixing means have a tapering form for fixing the cable end with the outer ends.

5. The connecting device of claim 1, wherein the conductive layer is compressible at least in a radial direction.

6. The connecting device of claim 1, wherein the insulator extends in a longitudinal direction beyond the insertion bush.

7. The connecting device of claim 1, further comprising at least one spacer for holding the conductive layer at a predetermined diameter wherein the at least one spacer is detachable from the connecting device after the cable end is inserted into the connecting device.

8. The connecting device of claim 1, wherein spring means are arranged around the conductive layer to compress the conductive layer in a radial direction.

9. The connecting device of claim 1 for connecting two or more cable ends, wherein each cable end further comprises a field control sheath arranged around the insulating sheath, the connecting device comprising:
   a field control layer provided around the insulator for controlling the electrical field between the field control sheaths, wherein the conductive layer is arranged around the field control layer and
   wherein the insulator, the field control layer and the conductive layer are in cooperative contact with respectively the insulating sheaths, the field control sheaths and the earth shields of the cable ends.

10. The connecting device of claim 9, wherein the field control layer extends in a longitudinal direction beyond the insulator.

11. The connecting device of claim 9, wherein the conductive layer extends in a longitudinal direction beyond the field control layer.

12. The connecting device of claim 9 for connecting two or more cable ends, wherein each cable end further comprises a protective sheath, the connecting device further comprising:
   a protective sleeve for cooperatively contacting the insulator, the field control layer, the conductive layer and the protective sleeve to respectively the insulating sheaths, the field control sheaths, the earth shields and the protective sheaths of the cable ends.

13. The connecting device of claim 12, wherein the insertion bush, the insulator, the field control layer, the conductive layer and the protective sleeve are integrated into one element.

14. The connecting device of claim 12, wherein the protective sleeve, in the inserted situation, extends in a longitudinal direction beyond the end of a stripped part of the cable end.

15. The connecting device of claim 14, wherein the fixing means are close to the outer ends of the protective sleeve.

16. The connecting device of claim 1, wherein the clamping means engage on the inserted cores and the fixing means engage on at least one of the earth shield, the insulating sheath and the field control sheath.

17. The connecting device of claim 1, wherein the clamping means provide a low resistance to a movement of the core ends in an insertion direction and provide a high resistance to movement in the opposite direction.

18. The connecting device of claim 17, wherein the clamping means comprise a number of lips extending obliquely in the insertion direction.

19. The connecting device of claim 1, wherein the fixing means comprise a sleeve which is arranged around the conductive layer and shrinkable at least in a radial direction.

20. The connecting device of claim 19, wherein the shrinkable sleeve is formed by the protective sleeve.

21. The connecting device of claim 19, wherein the shrinkable sleeve is manufactured from a heat-activated plastic.

22. The connecting device of claim 21, wherein the fixing means further comprise heating means to cause the shrinkable sleeve to shrink through heat.

23. The connecting device of claim 22, wherein the heating means comprise at least one resistance wire arranged on the shrinkable sleeve.

24. A method for mutually connecting two cable ends, the cable ends each comprising a core, an insulating sheath and an earth shield, the method comprising the steps of:
   providing a connecting device comprising an insertion bush having clamping means with an insulator therearound and a conductive layer;
   stripping each cable end in stepwise manner;
   successively inserting each core of each cable end into the insertion bush of the connecting device, whereupon insertion of the cores into the insertion bush causes the clamping means to secure the core ends therein; and wherein after the cores are secured within the insertion bush, the cores of the different cable ends are in cooperative contact with the insertion bush to provide conductive contact between the cores of the different cable ends and the insulator and the conductive layer are in cooperative contact with respectively the insulating sheaths and the earth shields of the cable ends; and fixing the cable ends relative to the connecting device.

25. The method of claim 24, wherein fixing the cable ends relative to the connecting device comprises applying heat to a component of the connecting device made from heat-shrinkable material.

26. The method of claim 24, wherein inserting the cable ends into the connecting device results in a conductive connection between the two cable ends.

27. The method of claim 24, further comprising detaching one or more spacers from the connecting device after inserting the cable ends into the connecting device.

28. The method of claim 24, wherein the earth shield is folded over after the stepwise stripping of each cable end.

29. The method of claim 28, further comprising placing a sleeve between the cable end and the folded earth shield in order to prevent the earth shield from being pressed into the cable end.

30. The method of claim 24, further comprising, stripping a part of the insulating sheath of the cable to a substantially constant diameter.

31. The method of claim 30, further comprising stripping the insulating sheath of the cable such that a conical transition results between said part of the insulating sheath and a field control sheath.

32. A connecting device for connecting a stripped cable end to an end element, wherein the cable comprises a core, an insulating sheath and an earth shield, the connecting device comprising:

an insertion bush comprising clamping means for inserting the core of the cable, whereupon insertion of the core into the insertion bush causes the clamping means to secure the core therein;

a sleeve-shaped insulator arranged around the insertion bush;

a fixing means for fixing the cable end to the device; and wherein after the core is secured within insertion bush, the insertion bush is in cooperative contact with the core to provide electrical contact between the core and the end element, and wherein the insulator of the connecting device is in cooperative contact with the insulating sheath of the cable.

33. The connecting device of claim 32, wherein the insertion bush, the field control layer and the insulating sheath are integrated into one element.

34. The connecting device of claim 32, wherein the fixing means comprise a tube which is arranged around the conductive layer and which is compressible in at least a radial direction.

35. The connecting device of claim 32, wherein the fixing means comprise an elastic sleeve arranged around the conductive layer.

36. The connecting device of claim 32, wherein the fixing means comprise a sleeve arranged around the conductive layer, wherein both outer ends of the fixing means have a tapering form for fixing the cable end with the outer ends.

37. The connecting device of claim 32, wherein the conductive layer is compressible at least in a radial direction.

38. The connecting device of claim 32, wherein the insulator extends in a longitudinal direction beyond the insertion bush.

39. The connecting device of claim 32, further comprising at least one spacer for holding the conductive layer at a predetermined diameter, wherein the at least one spacer is detachable from the connecting device after the cable is inserted into the connecting device.

40. The connecting device of claim 32, wherein spring means are arranged around the conductive layer to compress the conductive layer in a radial direction.

41. The connecting device of claim 32, wherein the cable further comprises a field control sheath arranged around the insulating sheath, and the device further comprises:

a field control layer arranged on a part of the inner surface of the insulator, wherein the insulator of the connecting device is in cooperative contact with the insulating sheath of the cable and the field control layer of the connecting is in cooperative contact with the field control sheath of the cable.

42. The connecting device of claim 41, wherein the field control layer extends in a longitudinal direction beyond the insulator.

43. The connecting device of claim 41, wherein the conductive layer extends in a longitudinal direction beyond the field control layer.

44. The connecting device of claim 32, wherein the insulator also connects to the earth shield of the cable.

45. The connecting device of claim 44, wherein the protective sleeve, in the inserted situation, extends in a longitudinal direction beyond the end of a stripped part of the cable end.

46. The connecting device of claim 45, wherein the fixing means are close to the outer ends of the protective sleeve.

47. The connecting device of claim 32, wherein the clamping means engage on the inserted cores and the fixing means engage on at least one of the earth shield, the insulating sheath and the field control sheath.

48. The connecting device of claim 32, wherein the clamping means provide a low resistance to a movement of the core ends in an insertion direction and provide a high resistance to movement in the opposite direction.

49. The connecting device of claim 48, wherein the clamping means comprise a number of lips extending obliquely in the insertion direction.

50. The connecting device of claim 32, wherein the fixing means comprise a sleeve which is arranged around the conductive layer and shrinkable at least in a radial direction.

51. The connecting device of claim 50, wherein the shrinkable sleeve is formed by the protective sleeve.

52. The connecting device of claim 50, wherein the shrinkable sleeve is manufactured from a heat-activated plastic.

53. The connecting device of claim 52, wherein the fixing means further comprise heating means to cause the shrinkable sleeve to shrink through heat.

54. The connecting device of claim 53, wherein the heating means comprise at least one resistance wire arranged on the shrinkable sleeve.

55. A method for connecting to an end element, a cable end comprising a core, an insulating sheath and an earth shield, the method comprising the steps of:

providing an end element comprising an insertion bush having clamping means, a connecting end connected thereto and a sleeve-like insulator;

attaching a connecting device to the end element, stripping the cable end in stepwise manner;

inserting the cable end into the connecting device;

wherein the cable end is inserted into the connecting device until the core is in cooperative contact with the insertion bush and the insertion bush provides conductive contact between the cores and the connecting end, and the insulator is in cooperative contact with the insulating sheath of the cable end;

whereupon insertion of the core into the insertion bush causes the clamping means to secure the core therein; and fixing the cable end relative to the connecting device.

56. The method of claim 55, wherein fixing the cable end relative to the connecting device comprises applying heat to a component of the connecting device made from heat-shrinkable material.

57. The method of claim 55, wherein inserting the cable end into the connecting device results in a conductive connection between the cable end and the end element.

58. The method of claim 55, further comprising detaching one or more spacers from the connecting device after inserting the cable end into the connecting device, wherein the detaching results in a conductive connection between the cable end and the end element.

59. The method of claim 55, wherein the earth shield is folded over after the stepwise stripping of the cable end.

60. The method of claim 59, further comprising placing a sleeve between the cable end and the folded earth shield in order to prevent the earth shield from being pressed into the cable end.

61. The method of claim 55, further comprising stripping a part of the insulating sheath to a substantially constant diameter.

62. The method of claim 61, further comprising stripping the insulating sheath such that a conical transition results between said part of the insulating sheath and a field control sheath.

63. A connecting device for connecting to a stripped end of a cable, wherein the cable comprises a core, an insulating sheath and an earth shield, the connecting device comprising:

an insertion bush having clamping means for insertion of the core of the cable therein, whereupon insertion of the core into the insertion bush causes the clamping means to secure the core therein;

an insulator arranged around the insertion bush;

a conductive layer arranged around the insulator;

a fixing means for fixing the stripped end of the cable to the connecting device; and wherein after the core is secured within the insertion bush, the insertion bush is in cooperative contact with the core, the insulator is in cooperative contact with the insulating sheath, and the conductive layer is in cooperative contact with the earth shield.

64. The connecting device of claim 63 wherein the clamping means secures the core within the insertion bush by exacting pressure against the core as the core is inserted into the insertion bush.

65. The connecting device of claim 64 wherein the clamping means comprises a plurality of oblique annular members directed in the direction of insertion.

* * * * *